United States Patent [19]
Dietzen

[11] 3,883,943
[45] May 20, 1975

[54] PROCESS OF MANUFACTURING DRILL CHUCKS

[75] Inventor: William Hugh Dietzen, Fayetteville, N.C.

[73] Assignee: The Black and Decker Manufacturing Company, Towson, Md.

[22] Filed: Nov. 21, 1973

[21] Appl. No.: 417,843

[52] U.S. Cl. ............... 29/413; 29/417; 29/428; 29/558; 279/62
[51] Int. Cl. ............................................ B23p 17/00
[58] Field of Search ............ 29/413, 416, 417, 558, 29/414, 426, 428, 434, 446, 27, 38 A, 38 B; 279/60, 62; 76/101 R, 101 D

[56] References Cited
UNITED STATES PATENTS

| | | | |
|---|---|---|---|
| 1,860,605 | 5/1932 | Baldwin, Jr. | 29/417 UX |
| 2,134,749 | 11/1938 | Burt | 29/413 |
| 2,213,040 | 8/1940 | Drissner | 29/558 |
| 2,702,216 | 2/1955 | Stearns | 29/413 X |
| 3,546,762 | 12/1970 | Martin | 29/413 X |
| 3,810,642 | 4/1972 | Derbyshire | 279/62 |

*Primary Examiner*—C. W. Lanham
*Assistant Examiner*—Victor A. DiPalma
*Attorney, Agent, or Firm*—Joseph R. Slotnik; Leonard Bloom; Edward D. Murphy

[57] ABSTRACT

A process of making drill chuck nuts including the steps of selecting a piece of bar stock, forming a hole therein, forming the outside diameter configuration for a chuck nut on the bar stock, forming the inside diameter configuration of the chuck nut in the bar stock, cutting a pair of breaking slots in the external surface of the stock, cutting internal threads in the stock, cutting off the formed nut, and breaking the nut at the breaking slots. The broken nut parts are thereafter assembled to a formed chuck body having jaws in place thereon, and a sleeve is placed in retaining relation over the parts.

7 Claims, 10 Drawing Figures

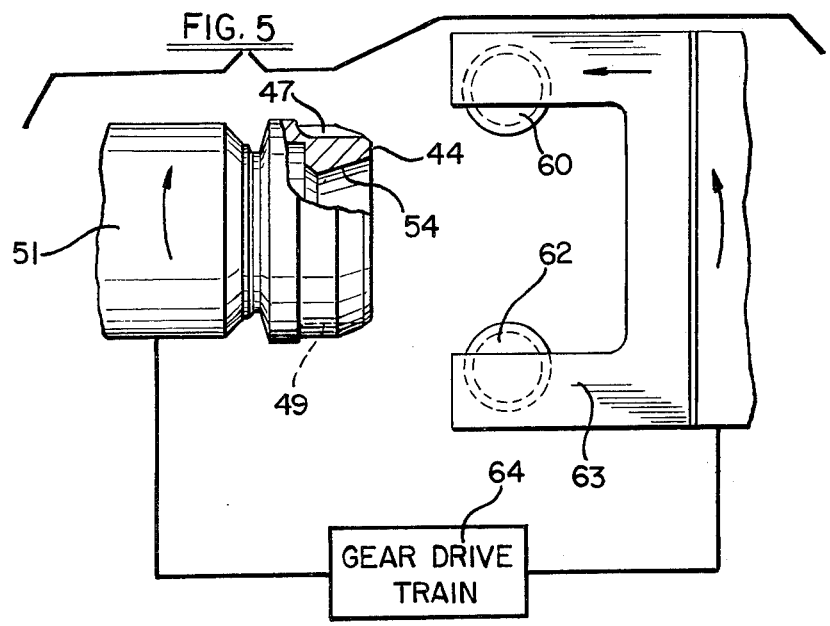
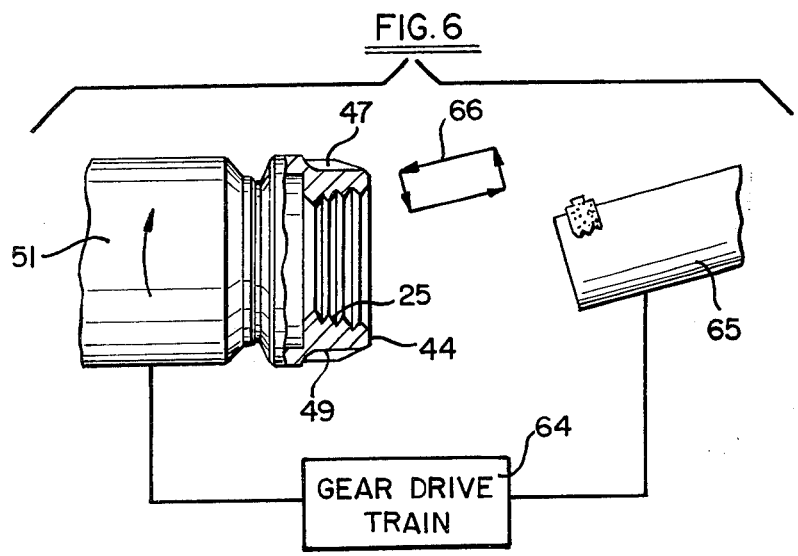
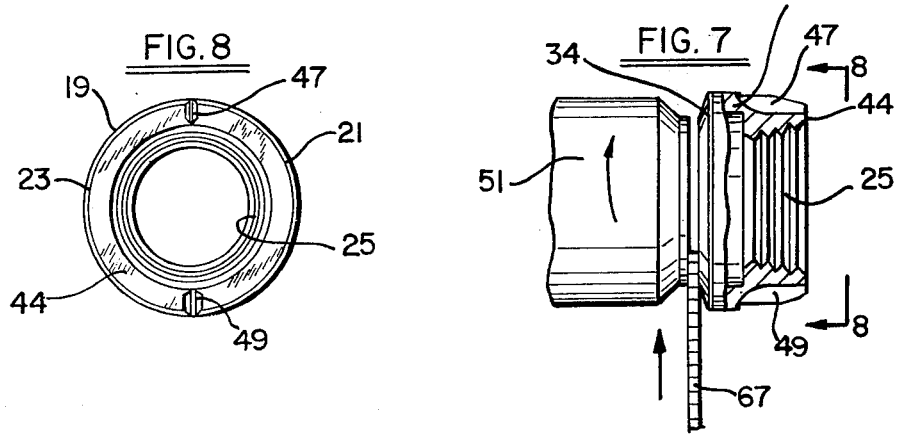

PROCESS OF MANUFACTURING DRILL CHUCKS

SUMMARY OF THE INVENTION

The present invention is directed to the improvement, in the process of manufacturing drill chucks, of positively orienting and locating breaking slots relative to threads in the chuck nut to facilitate either automatic or significantly easier manual assembly of the chuck nut parts to a subassembled chuck body and jaws. Heretofore, in general, the internal threads in chuck nuts were formed or cut on a separate machine independently of the orientation or location of the chuck nut breaking slots which define the breaking points for the nut. Since the chuck nut must seat properly on the chuck body, and the nut threads must mate with threads on the chuck jaws, it has been customary and necessary to hand assemble the chuck nut parts to chuck bodies. In addition, chuck nuts formed with "independently" cut threads and breaking slots require the assembly operator to manually seek the proper angular orientation of the chuck nut parts on the assembled chuck body and chuck jaws so that the chuck nut threads properly mate with the chuck jaw threads before the chuck nut retaining sleeve can be placed over the chuck nut. In other words, after the chuck jaws are assembled to the chuck body, the assembly operator then places the chuck nut parts into position on the chuck body and manually turns the chuck nut parts back and forth, until he is assured that the chuck nut is properly seated on the chuck body, and the nut threads properly engaged with the jaw threads. This is a difficult and time consuming process, and adds significantly to the overall manufacturing time, hence to the cost of the produced chuck. Furthermore, automatic assembly of chuck nut parts to assembled chuck bodies and jaws has been impossible with the described current manufacturing techniques for chuck nuts, since machinery capable of turning the chuck nut parts back and forth pursuant to proper seating of the nut parts on the body, and proper engagement of the nut threads with the threads of the chuck jaws, is not practical.

In the present invention, the difficulties outlined above are overcome in that the location of the threads on the chuck nut relative to the breaking slots is accurately and precisely controlled. Thus, knowing this, and the position of chuck jaw threads relative to the body, the assembly step of the chuck nut parts to the subassembled chuck body and jaws is significantly simplified. Furthermore, this invention makes possible automatic assembly of the described chuck parts.

The main objects of the present invention, therefore, are to provide an improved process of manufacturing drill chucks wherein the threads formed in the chuck nut are accurately controlled and located relative to the breaking slots therein and wherein accurate and easy assembly of broken chuck nut parts to an assembled chuck body and jaws is readily achieved.

Further important objects of the present invention are to provide an improved process of the above character which facilitates either easier manual assembly of chuck nut parts to chuck bodies and jaws, or which may be used to facilitate automatic assembly of these parts.

Additional important objects of the present invention are to provide an improved process of the above character which results in a relatively low cost drill chuck, but one which is reliable and efficient in use.

Other important objects of the present invention will become more apparent from a consideration of the detailed description to follow taken in conjunction with the drawings annexed hereto.

BRIEF DESCRIPTION OF THE DRAWINGS

FIGS. 5 and 6 are diagramatic views illustrating the steps of forming the breaking slots and threads on the chuck nut in accordance with the present invention;

FIG. 7 is a diagramatic view illustrating cut-off of the formed nut from the bar stock;

FIG. 8 is an end view of the cut-off nut taken along the line 8—8 of FIG. 7;

DETAILED DESCRIPTION

Figure 1:
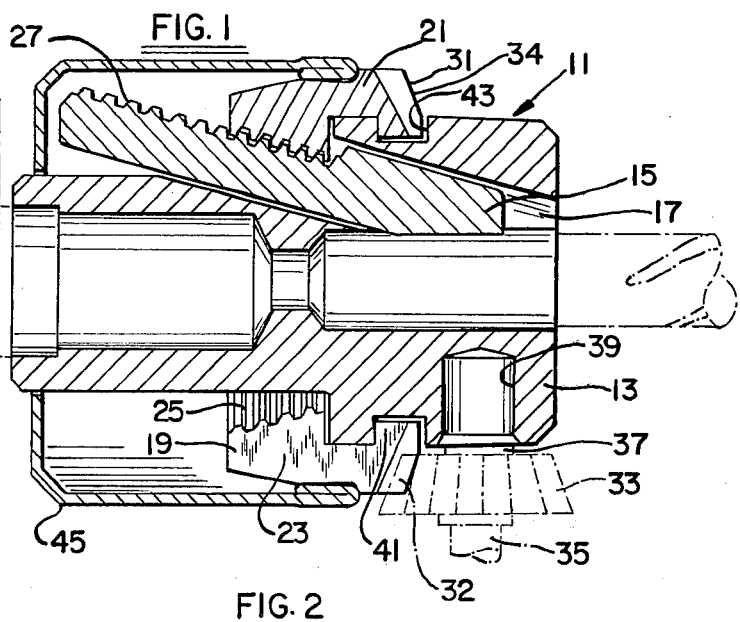
FIG. 1 is a longitudinal sectional view illustrating a drill chuck made in accordance with the present invention.

Referring now more specifically to the drawings, a drill chuck manufactured in accordance with the present invention is illustrated generally at 11 in FIG. 1 and is seen to include a chuck body 13 having a plurality of angularly disposed jaws 15 slidably disposed in tapered openings 17 formed therein. A chuck nut 19 formed of semicylindrical parts 21, 23 surrounds the body 13 and is formed with internal threads 25 which engage threads 27 on jaws 15. The chuck nut 19 and jaws 15 are operated in the usual fashion, that is, nut 19 is provided with teeth 31 engageable with teeth 33 formed on a key 35, the latter having a pilot 37 receivable in one of a plurality of pilot openings 39 formed in the body 13. Thus, when the key 35 is positioned with its pilot 37 in one of the openings 39, and with the key teeth 33 engaging nut teeth 31, the key 35 is turned and causes the nut 19 to also turn and feed the jaws 15 inwardly or outwardly along openings 17, depending upon the direction of rotation of nut 19. The nut parts 21, 23 are retained in place axially of the body 13 by an interfitting annular flange 41 and groove 43 on the nut and body, respectively. The chuck nut parts 21, 23 are held together in place on the body 13 by a sleeve 45. The overall structure of this chuck is described and claimed in the copending application of Dietzen, et al, Ser. No. 356,615, filed May 2, 1973 and assigned to the assignee of this application.

In the drill chuck assembly process, formed jaws 15 are positioned in body openings 17 and nut parts 21, 23 are placed on the body 13 with the flange 41 fitted in groove 43 and with threads 25 in engagement with the threads 27. Thereafter, the sleeve 45 is assembled over the nut parts 21, 23. It has been standard commercial practice in the field of chuck manufacturing to cut the nut threads 25 on the internal surface of the nut 19, and, independently, to cut breaking slots 47, 49 on the chuck nut 19. The breaking slots 47, 49 weaken the chuck nut 19 and allow it to be thereafter broken at these areas, thereby forming the parts 21, 23. However, when these formed and broken nut parts 21, 23 were assembled to the body 13 with the jaws 15 as described above, the random disposition of the threads 25 relative to slots 47, 49 required that one assembling the chuck manually manipulate the nut parts 21, 23, such as by turning the nut parts 21, 23 back and forth on body 13, to achieve proper positioning of the nut parts 21, 23, i.e., flange 41 in groove 43, and threads 25 engaged with the jaw threads 27, before the sleeve 45 could be positioned over the nut parts 21, 23. Furthermore, this condition, that is, the necessity to manually "feel" proper fit up of the nut parts 21, 23 to the body 13 and jaws 15, virtually prevented any consideration of automating this assembly process. In the present invention, as briefly set out above, precise control is maintained over the orientation and location of threads 25 relative to the breaking slots 47, 49 so that significantly easier manual assembly of the nut parts 21, 23 to the jaws 15 and body 13 is achieved. Furthermore, this invention now makes possible automatic assembly of these parts.

Thus, in the present invention, the chuck nut 19 is formed on machinery wherein close, positive and accurate control is maintained to insure that the nut threads 25 are accurately located relative to the breaking slots 47, 49. This is achieved, in a preferred form, by positively gearing the means for cutting the breaking slots 47, 49 with the means for cutting the threads 25 and the means for turning the bar stock 51. Thus, the exact location of the breaking grooves, 47, 49 to the threads 25 is known and is accurately controlled. Then, with a known location of the chuck jaws 15 (and their threads 27) relative to the body 13 (and its groove 43), the nut parts 21, 23 are readily fitted accurately on the body 13 and in engagement with the jaw threads 27.

Figure 2:
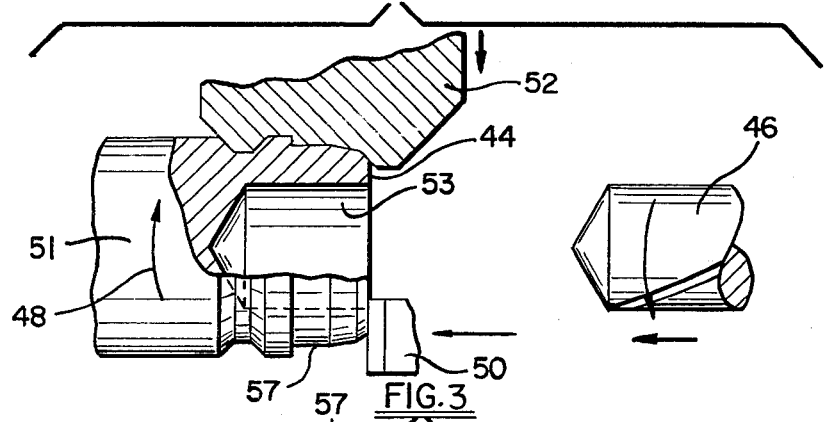
FIGS. 2–4 are diagramatic views illustrating preliminary steps followed in converting bar stock to a chuck nut.

Turning now to a consideration of FIGS. 2–4, the initial processing for the chuck nut 19 will be described. In a preferred manufacturing sequence, the chuck nut originates in a length of bar stock 51 fed to a high speed six-spindle automatic screw machine. After being axially located in this machine, the stock 51 is rotated by means (not shown) in the direction of arrow 48. At a first station, illustrated in FIG. 2, a facing tool 50 squares up the end face 44 of bar stock 51, a drill 46 forms opening 53, and a form tool 52 rough forms an outer contoured surface 57 on the bar stock 51. It will be understood that tools 46, 50, 52 are suitably energized and moved in the direction of the arrows shown in FIG. 2 by means (not shown) associated with the screw machine.

Figure 3:
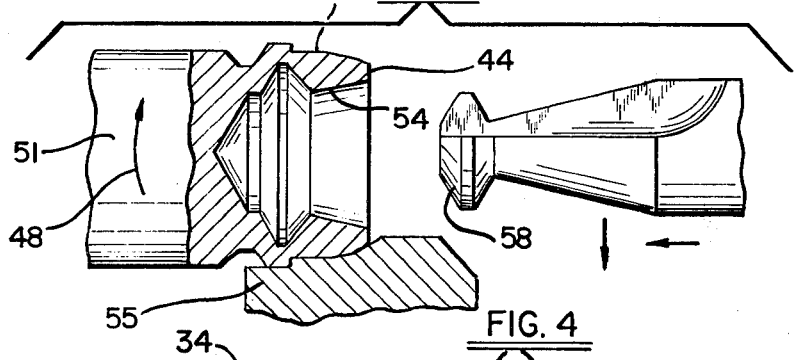
Figure 4:
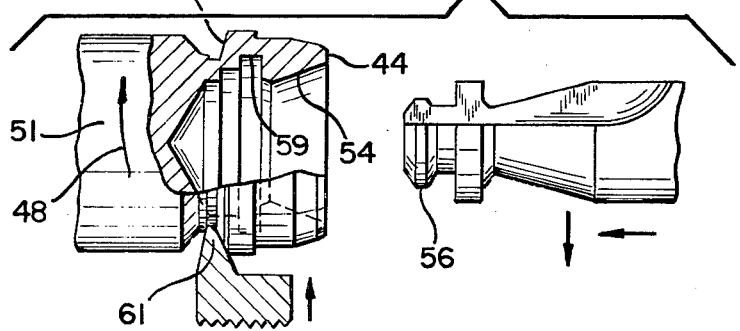

Upon completion of this operation, the shaped bar stock 51 moves to the next screw machine station, represented in FIG. 3. At this station, a recess tool 58 moves into the opening 53 in rotating stock 51 and forms the shaped recess 54, while a forming tool 55 finish forms surface 57. Here again, tools 55, 58 are moved in the direction of the arrows to perform the described shaping steps by suitable means associated with the screw machine. At the next screw machine station, shown in FIG. 4, another recess tool 56 forms still further contour 59 in recess 54 while a form tool 61 shapes a tapered surface 34 on the rotating stock 51.

The shaped stock 51 then moves to a breaking slot cutting station, represented at FIG. 5. Here, the rotating stock 51 is disposed adjacent a rotating milling head 63 provided with a pair of diametrically opposed milling cutters 60, 62. The stock 51 and head 63 are rotatably driven in "positive" fashion, i.e., no clutches or slip connections, at the same speed through a gear drive train schematically represented at 64, while the milling head 63 is linearly moved toward and away from stock 51 by suitable means such as a cam feed powered from train 64. Thus, the rotating and reciprocating head 63 advances on the stock 51 and milling cutters 60, 62 cut slots 47, 49 therein, as shown in FIG. 5.

The rotating stock 51, still controlled by positive drive train 64, moves to the next station represented at FIG. 6. Here, a thread cutter 65, also positively and continuously driven from drive train 64, and therefore accurately positioned relative to milling cutters 60, 62, cuts threads 25 in the shaped opening 54. The positive and continuous operation of thread cutter 65 eliminates lost time and lost orientation or timing between the cut threads 25 and the breaking slots 47, 49 which would otherwise occur if the drive train for thread cutter 65 included clutching for start up. To carry out this thread cutting task requires that cutter 65 follow a rectangular path 66, and may require multiple passes removing progressive amounts of material, as will be understood by those skilled in the art. Following this, stock 51 moves to the final station, FIG. 7, where a cut-off tool 67 advances and severs the formed nut 19 from stock 51. Stock 51 is then advanced and the entire sequence repeated.

It will be appreciated, as discussed above, that it is important to this invention that the thread cutting tool 65 cut the threads 25 in the shaped opening 54 of stock 51 in accurate angular relation to the breaking grooves 47, 49. This is achieved by positively gearing, that is without clutches, thread cutting tool 65 to the milling head 63 used to form the breaking grooves 47, 49, and to the rotating stock 51 itself. It is a simple but important step in this invention, and one not heretofore contemplated in the manufacture of chuck nuts or assembly of drill chucks and one which results in a formed chuck nut capable of ready and easy and even automatic assembly to a chuck body and chuck jaws.

Figure 9:
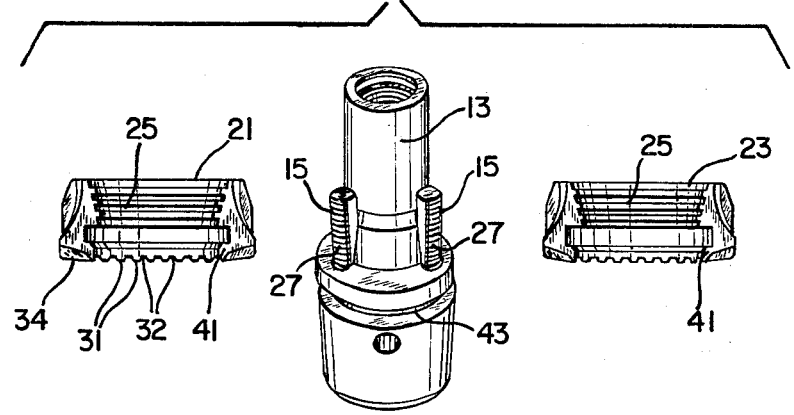
FIG. 9 is a perspective view showing broken chuck nut parts formed in accordance with the present invention prior to assembly to a chuck body.
Figure 10:
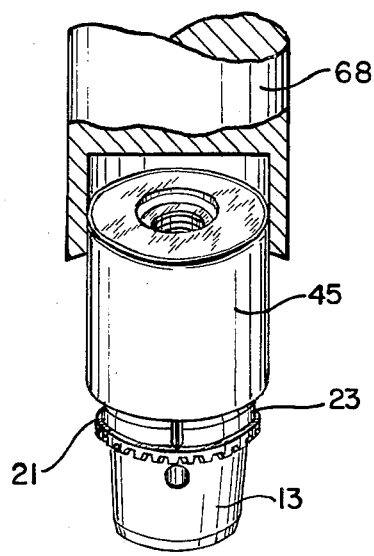
FIG. 10 is a view showing a chuck manufactured in accordance with the present invention as a retaining sleeve is positioned over the nut parts.

After formation of nut 19 (FIG. 8), grooves 32 may be cut in shaped face 34 forming teeth 31 and the nut 19 is broken into parts 21, 23 which are then placed in position on a body 13 having jaws 15 assembled thereto (FIG. 9). Following this, retaining sleeve 45 is pressed over nut parts 21, 23 by suitable press 68 (FIG. 10).

Knowing the angular location of threads 25 relative to breaking notches 47, 49 allows ready positioning of the nut parts 21, 23 on the body 13 with the flange 41 in groove 43 and threads 25 engaging threads 27 since the position of jaws 15 and threads 27 relative to body 13 is easily controlled. This significantly reduces the time and skill required of the operator and contributes to an overall reduction of costs in manufacturing the chuck 11. Furthermore, as described, the known orientation of the threads 25 with respect to the breaking grooves 47, 49, and the facilitated ease of direct assembly of the nut segments 21, 23 to the body 13 and jaws 15, makes possible automation of this assembly process. In this connection, it may be desirable to form the breaking notches 47, 49 different from one another, for example, of different width or configuration, as shown in FIG. 8, to allow precise orientation of the start of threads 25 relative to one of the notches. This can be achieved by using cutters 60, 62 of different size. This feature can also assist in faster hand or manual assembly of the nut parts to the body. In either event, it will be understood that this invention significantly contributes to the overall reduction in assembly costs for this chuck 11.

By the foregoing, there has been disclosed an improved process for manufacturing a chuck nut and assembling chuck nut segments to a chuck body and jaws calculated to fulfill the inventive objects hereandabove set forth. While a preferred embodiment of the present invention has been set forth and described in detail, it will be understood that various additions, substitutions, modifications and omissions may be made thereto without departing from the spirit of the invention.

I claim:

1. A method of manufacturing drill chucks comprising the steps of forming a hollow chuck nut body, cutting a pair of diametrically opposed, breaking slots in said hollow body, cutting internal threads in said body at a positive and known angular location with respect to said breaking slots, breaking said hollow body at said breaking slots to form a pair of semicylindrical nut parts, assembling said nut parts to a chuck body and chuck jaws subassembly with the threads on said nut parts engaged with threads on said chuck jaws, and assembling a sleeve over said nut parts.

2. A method of manufacturing drill chucks comprising the steps of selecting a chuck nut constructed of hollow stock, continuously rotating said hollow stock from a power source connected thereto, through positive gearing, cutting a pair of diametrically opposed, breaking slots in said continuously rotating stock by continuously rotating cutter means fed axially toward said stock by means connected to said gearing, cutting internal threads in said continuously rotating, hollow stock by means positively and directly connected to said power source through said gearing, breaking said nut at said breaking slots, and assembling the broken parts of said nut to a chuck body having threaded jaws assembled thereto by locating said nut parts axially of said body and engaging the threads of said parts with the threads on said jaws.

3. A method of manufacturing a drill chuck nut which comprises the steps of forming a hollow nut body having a contoured cross section, continuously rotating said nut body from power means connected thereto by positive gearing, cutting a pair of diametrically opposed, axially extending slots in said continuously rotating body by a continuously rotating cutter positively connected to said power means through said gearing, and forming internal threads in said continuously rotating body by a generally axially moving thread cutting tool positively connected to said power means through said gearing, and breaking said nut into a pair of semicylindrical parts along said breaking slots.

4. A method of manufacturing drill chucks comprising the steps of forming a hollow chuck nut body, cutting a pair of differently shaped, diametrically opposed, breaking slots in said hollow body by power driven cutter means, cutting internal threads in said body by power driven cutter means positively and continuously connected to said slot forming cutter means at a positive and known angular location with respect to the individual ones of said breaking slots, breaking said hollow body at said breaking slots to form a pair of semicylindrical nut parts, angularly orienting the nut parts to a chuck body and chuck jaws subassembly using the differently shaped slots, and assembling said nut parts to said chuck body and chuck jaws subassembly with the threads on said nut parts engaged with threads on said chuck jaws, and assembling a sleeve over said nut parts.

5. A method of manufacturing drill chucks comprising the steps of selecting a chuck nut constructed of hollow stock, continuously rotating said hollow stock from a power source positively connected thereto, cutting a pair of diametrically opposed, breaking slots in said continuously rotating stock by continuously rotating cutter means fed axially toward said stock by means positively connected to said power source, cutting internal threads in said continuously rotating, hollow stock by means positively connected to said power source, breaking said nut at said breaking slots, and assembling the broken parts of said nut to a chuck body having threaded jaws assembled thereto by locating said nut parts axially of said body and engaging the threads of said parts with the threads on said jaws.

6. A method of manufacturing a drill chuck nut which comprises the steps of forming a hollow nut body having a contoured cross section, continuously rotating said nut body from power means connected thereto by a positive, non-slip transmission, cutting a pair of diametrically opposed, axially extending slots in said continuously rotating body by a continuously rotating cutter positively connected to said power means through said transmission, and forming internal threads in said continuously rotating body by a generally axially moving thread cutting tool positively connected to said power means through said transmission and breaking said nut into a pair of semicylindrical parts along said breaking slots.

7. A method of manufacturing a drill chuck nut which comprises the steps of forming a hollow nut body having a contoured cross section, continuously rotating said nut body from power means connected thereto by a positive, non-slip transmission, cutting a pair of diametrically opposed, axially extending slots in said continuously rotating body by a continuously rotating cutter positively connected to said power means through said transmission, and forming internal threads in said continuously rotating body by a generally axially moving thread cutting tool positively connected to said power means through said transmission.

* * * * *